April 14, 1970  R. B. HANBICKI  3,506,873
METHOD AND APPARATUS FOR PRODUCING A PULSE TRAIN
Filed May 23, 1968  2 Sheets-Sheet 1
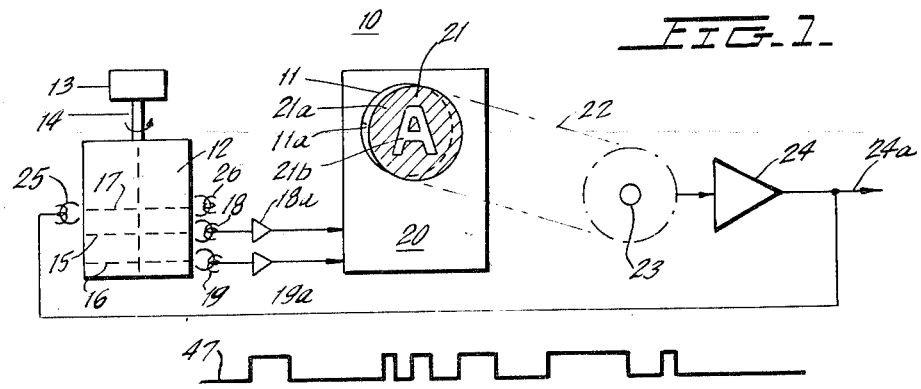
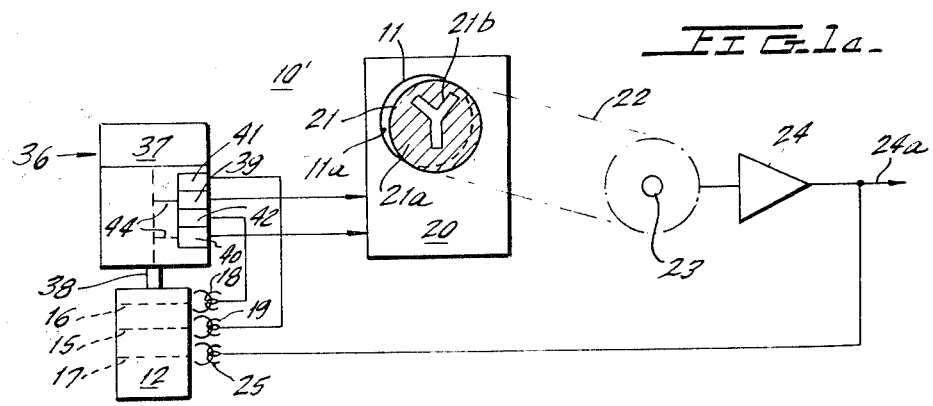
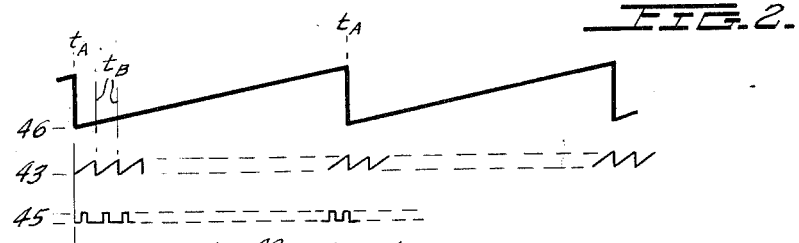
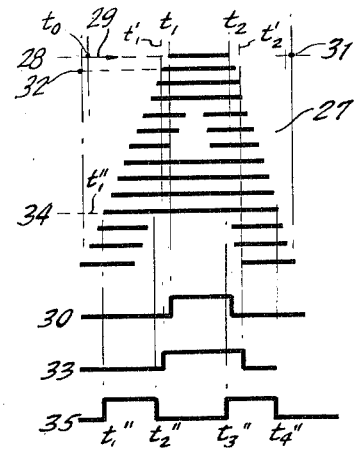
INVENTOR.
RICHARD B. HANBICKI
BY
OSTROLENK, FABER, GERB & SOFFEN
ATTORNEYS

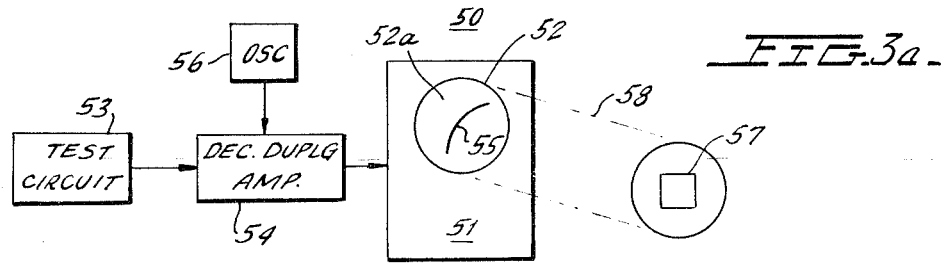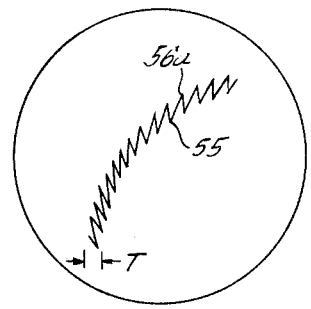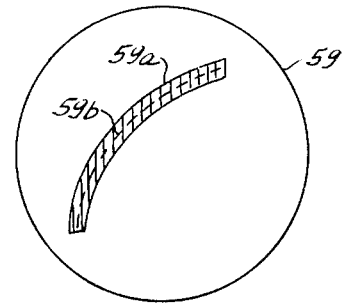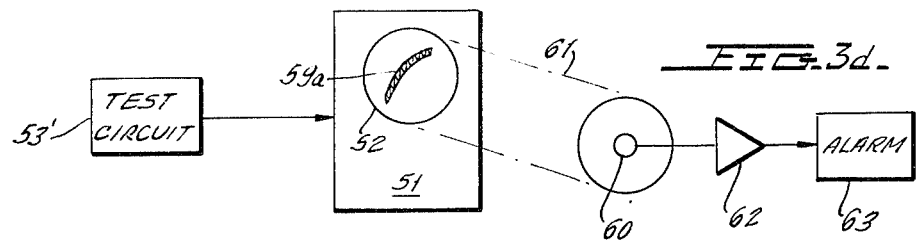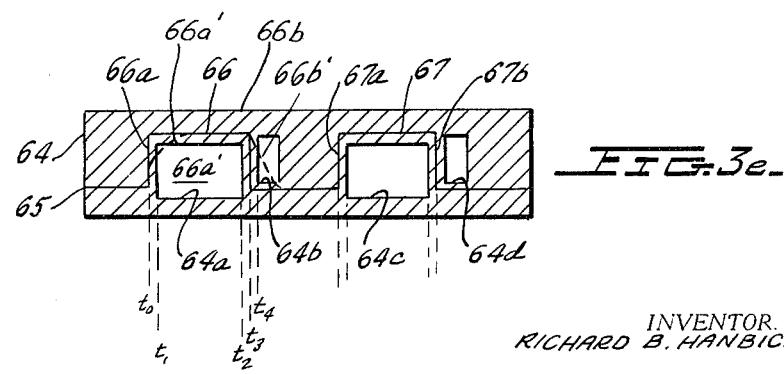

United States Patent Office 3,506,873
Patented Apr. 14, 1970

3,506,873
METHOD AND APPARATUS FOR PRODUCING A PULSE TRAIN
Richard B. Hanbicki, Princeton Junction, N.J., assignor to Madatron Corporation, Rocky Hill, N.J., a corporation of New Jersey
Filed May 23, 1968, Ser. No. 731,467
Int. Cl. G01r 17/04
U.S. Cl. 315—10                                13 Claims

ABSTRACT OF THE DISCLOSURE

Method and apparatus for producing a pulse train comprising oscilloscope means and means for causing the electron beam of the oscilloscope to scan the face thereof. A mask is positioned over the face of the oscilloscope, and light-sensitive means is employed to generate an output each time the electron beam passes through a cut-out (or transparent) portion of the mask. The pulse duration and spacing between pulses is determined by the scanning rate and the mask configuration. The pulses may be stored within suitable memory means such as a magnetic drum, magnetic tape or a light-sensitive surface. The pulse trains developed may be employed in a variety of applications such as, for example, character display systems.

In an alternative embodiment of the invention, the oscilloscope-mask concept maybe adapted for use in test circuitry. The desired output curve may be displayed and photographed or otherwise plotted by testing one such circuit. A dither signal may be superimposed upon the curve to establish a preselected deviation tolerance from the ideal curve characteristics to form the proper mask which may then be positioned over the oscilloscope's face for test of other such circuits. The electron beam is then caused to scan across the face of the oscilloscope in order to provide a trace of the operating characteristics. If the trace lies behind the opaque portion of the mask, an indication that the circuit characteristics fall within the desired tolerances is provided. If the trace falls outside of the opaque section of the mask at any point along the trace, an immediate indication is provided of the fact that the characteristics of the circuit under test do not fall within required tolerances. A variety of masks may be provided for similar applications such as, for example, the examination of pulse trains to determined whether their rise and fall times occur within the desired limits.

The present invention relates to pulse generating and electronic test circuitry, and more particularly to a method and apparatus for producing pulse trains having pulses of any desired pulse duration and spacing for use in a variety of applications, and further to method and apparatus for dynamic testing of electronic circuitry to determine whether the circuitry falls within desired limits of operation.

There exist a variety of applications in which it is desired to provide pulse generators for producing pulses of varying pulse width and spacing, which arrangement may be aperiodic, and the major problem is that of producing a pulse generator capable of yielding such characteristics. One particular example in which such a pulse generating means is employed is set forth in copending application Ser. No. 718,553, filed Apr. 3, 1968 by the instant inventor, and assigned to the assignee of this application. The above-mentioned copending application sets forth in detail a character display system in which information pulses of varying pulse duration and spacing are made available for the control of the character display system.

The pulse generating means employed in the above-mentioned application is comprised of a rotating memory drum system storing information pulses in one or more tracks of the drum, which pulses are read out in synchronism with synchronizing pulses for the control of sweep generators in order to trace any desired character or symbol upon the face of a cathode ray tube (hereinafter referred to as a CRT).

The present application teaches a method and apparatus for storing the information signals upon the rotating memory drum (which may also take a variety of other forms). The method is basically comprised of scanning the face of a CRT with an electron beam at a predetermined rate. The face of the CRT is covered with a mask having a cut-out or transparent portion which may, for example, be in the configuration of an alphabetic or numeric character, or other symbol. A suitable light-sensitive device such as, for example, a photomultiplier tube detects those periods during which the electron beam scans a transparent or cut-out portion of the mask generating an output signal whose time duration is equal to the time required for the electron beam to scan across the cut-out or transparent portion of the mask. These pulses are then applied to the desired track or tracks of the magnetic storage means which is caused to resolve (in the case of a magnetic drum) or be linearly moved (in the case of magnetic tape) relative to magnetic recording devices for storing the signals in one or more tracks of the drum.

As an alternative embodiment in the case where the desired pulse train may be employed for a variety of other applications, the same method and apparatus may be employed and the mask need only be modified to produce any desired arrangement of pulses whose duration and spacing may be varied by control of the electron beam sweep rate and the configuration of the transparent or cut-out portions of the mask.

A similar technique to that described above may be employed for the purpose of testing electronic circuitry. This method and apparatus is comprised of connecting one such circuit to be tested to a CRT for the purpose of generating a trace representing the desired characteristic. This characteristic is then either photographed or plotted for the purpose of developing a mask. A dither signal is superimposed upon the output signal of the circuit under test for generating a resultant trace to form a tolerance band for the characteristic. The opaque portion of the mask developed therefrom is formed in the shape of the trace including the tolerance band. Circuit testing is performed by connecting each of the remaining circuits under test to the oscilloscope and detecting by means of a light-sensitive device, such as a photomultiplier tube, the satisfactory or unsatisfactory characteristics of the circuit under test. The circuit will prove unsatisfactory if the trace or any portion thereof extends beyond the opaque portion of the mask. Alternatively, if trace remains beneath the opaque portion, an indication is provided that the dynamic characteristics of the circuit under test are satisfactory. Similar tests may be performed upon pulses to determine whether their rise time, fall time and pulse amplitude fall within required tolerances by forming a mask having transparent or cut-out portions which will indicate unsatisfactory pulse signals if the CRT trace at all moves into the transparent region of the mask.

It is, therefore, one object of the present invention to provide a novel method and apparatus for generating pulse trains of any desired pulse width and/or spacing through the employment of a mask in conjunction with a CRT for energizing a light-sensitive device and storing the signals developed by the light-sensitive device in suitable storage means during those periods in which the CRT electron beam traces a region on the face of the CRT which lies behind a transparent or cut-out portion of the mask.

Another object of the present invention is to provide a novel method and apparatus for generating pulse trains of varying pulse duration and spacing comprised of controlling the scan rate of a CRT electron beam and energizing a light-sensitive device each time the trace formed by the electron beam is permitted to pass light through a mask of a predetermined configuration, and further providing means for storing the signals generated by the light-sensitive device in suitable storage means wherein the configuration of the transparent or cut-out portions of the mask and the scanning rate of the electron beam may be adjusted to control the configuration of the desired pulse train.

Still another object of the present invention is to provide a novel method and apparatus for testing electronic circuitry comprised of developing a mask whose opaque portion constitutes the trace of the circuit under test, plus a tolerance band, and further comprising a CRT for generating a trace of each circuit under test and detecting either satisfactory or unsatisfactory results by placement of the mask between the CRT and the light-sensitive device to provide a positive indication of the circuit characteristics.

These as well as other objects of the present invention will become apparent when reading the accompanying description and drawings in which:

FIGURE 1 is a block diagram showing one preferred apparatus for performing the method of the present invention.

FIGURE 1a is a block diagram showing apparatus which is slightly modified from that shown in FIGURE 1.

FIGURE 2 shows a plurality of waveforms useful in explaining the apparatus of the present invention.

FIGURE 2a shows one trace and waveforms associated therewith in one application of the apparatus of FIGURES 1 and 1a.

FIGURE 3a shows apparatus useful in performing an alternative method of the present invention.

FIGURES 3b and 3c are plan views showing a trace developed by the apparatus of FIGURE 3a and a mask developed from the trace of FIGURE 3b, respectively.

FIGURE 3d shows the apparatus useful in performing the final testing step of the alternative method.

FIGURE 3e shows a waveform and a manner in which a mask may be arranged to check upon the satisfactory operation of a circuit generating the waveform.

FIGURE 1 shows the apparatus useful in producing a pulse train. The apparatus 10 is comprised of a CRT 11 of any conventional type which, for the purpose of understanding this invention, is comprised of means for generating an electron beam and means for deflecting the electron beam so as to form a trace across the face 11a of the CRT. Considering the application of the method and apparatus of FIGURE 1 to a character display system of the type described in the above-mentioned copending application, let it be assumed that it is desired to generate pulses of predetermined pulse duration and spacing, which pulses are utilized to form a character or other symbol in a character display device. FIGURE 1 is further comprised of a rotatable magnetic drum 12 driven at a constant predetermined angular velocity by motor 13 coupled to the drum by an output shaft 14. Let it be assumed that the magnetic tracks 15 and 16 provided on the drum store magnetic patterns which represent synchronizing signals for synchronizing Y and X sweep generators, respectively. These magnetic patterns are read from the revolving drum by means of read-out heads 18 and 19, respectively, and are applied to suitable inputs of an oscilloscope 20 which includes the CRT11. The synchronizing pulses drive X and Y sweep generators conventionally included within the circuitry of an oscilloscope to cause an electron beam to scan across the face of the CRT in a predetermined manner.

In order to generate the appropriate pulses, a mask 21 is positioned over the face 11a of CRT11. The mask is comprised of an opaque portion (which may, for example, be a negative 21a and a transparent (or cut-out) portion 21b). Although the mask is shown as being spaced from the face 11a of CRT11, it should be understood that the mask is placed directly in contact with face 11a during the performance of the method, and the spacing has been shown in FIGURE 1 only for purposes of explaining the apparatus.

A housing 22 which is normally hinged to the front face of oscilloscope 20 (for example, for the purpose of removing or inserting a mask) is moved in position with the face of CRT11 so as to seal the face and the confining interior space from any ambient light. The forward end of the housing 22 supports a light-sensitive device 23 which may, for example, be a photomultiplier tube which generates a signal as a result of being activated by any light present within housing 22. The output of light-sensitive device 23 is applied to an amplifier 24 which couples the amplified output signals to a recording head 25 for recording the signals generated by light-sensitive device 23 in track 17 of the memory drum 12.

The operation of the apparatus 10 occurs as follows:

The rotation of memory drum 12 causes the magnetic pattern in tracks 15 and 16 to be picked up by magnetic read heads 18 and 19, respectively. These signals are applied to sweep generators (not shown) provided within oscilloscope 20 for synchronizing their operation. If desired, amplifying circuits 18a and 19a may be provided to amplify the output signals of read-out heads 18 and 19 to suitable levels. The synchronizing signals trigger the operation of the sweep generators, causing the electron beam to scan a plurality of horizontal lines across the face 11a of CRT11 substantially in conventional fashion.

The electron beam impinges upon the interior face of CRT11, causing the phosphor material struck by electrons to emit light, thereby forming a trace across the face of the CRT. During those times in which the trace being generated lies behind the opaque region of the mask, no light is present within housing 22. However, as soon as the trace crosses a region which coincides with the transparent or cut-out portion 21b of the mask, the light passed through this portion of the mask, is picked up by the light-sensitive device 23, is amplified at 24, and is applied to recording head 25 for recording a signal in track 17. The duration of the pulse applied to record head 25 is controlled by the length of time that it takes the trace to cross the transparent portion of the mask which, in turn, is further controlled by the scanning rate of the electron beam. By employing the output pulses recorded in tracks 15 and 16 as the synchronizing pulses for the X and Y synch generators, synchronization of the synchronizing pulses together with the information pulses read in by record head 25 is assured. If pulses are being generated at extremely high speeds, obvious corrective measures may be taken to assure such synchronization, for example, by locating the read head 26 ultimately used for the read-out of track 17 slightly in front of or slightly behind the positions of read heads 18 and 19 to assure appropriate synchronization. At slower recording speeds, such adjustments are unnecessary.

FIGURE 2a is a diagram showing the traces formed across the face 11a of CRT11 and the pulses generated by light-sensitive device 23 as a result thereof. As shown in FIGURE 1, the transparent or cut-out portion is in the configuration of the letter A. FIGURE 2a showns a similar trace 27. Let it be assumed that the electron beam begins its trace near the upper left-hand portion of the tube face at a time $t_0$. The trace continues from the starting point 28, moving in the direction shown by arrow 29 until, at time $t_1$, the trace is exposed in the transparent portion 21b of the mask. The light-sensitive device 23 is abruptly activated generating a pulse indicated by waveform 30, which pulse begins at time $t_1$ and terminates at time $t_2$. The pulse terminates at this time due to the fact that the trace moves behind the opaque portion of the mask. The first horizontal line traced terminates at point 31. The abrupt cut-off of the sweep generator abruptly returns the electron beam to point 32 in order to begin the trace of the second horizontal line. As soon as the second horizontal line trace passes behind the transparent region of the mask (at time $t_1'$), the light-sensitive device 23 is again activated, generating a pulse indicated by waveform 33, which pulse begins at time $t_1'$ and terminates at time $t_2'$, the termination of the pulse resulting from the fact that the trace has moved behind the opaque portion of the mask 21. It can clearly be seen that the pulses shown by waveforms 30 and 33 are of differing pulse duration. Each additional horizontal line trace generates pulses in a similar fashion. It can be seen that some of the horizontal line traces will each generate two pulses. For example, considering the line designated by numeral 34, a first pulse begins at time $t_1''$ and terminates at time $t_2''$. Moving across the same horizontal line, the trace again causes a second pulse to be generated, which pulse begins at time $t_3''$ and terminates at time $t_4''$. While the example given herein teaches a method for generating pulses representative of the character A, it should be understood that the mask may be cut, photographed, or otherwise formed so as to generate pulses representing any other character, number or symbol.

If desired, the drum may be rotated at a first slow rate of speed during the pulse-producing operation described hereinabove and may be operated during normal read-out at a second high rate of speed. The synchronization of the signals in tracks 15 through 17 is still nevertheless assured.

As an alternative arrangement, the magnetic drum assembly may be completely dispensed with and the oscilloscope itself may be employed as the means for generating the desired pulse train. As one example, the scanning rate of the electron beam may be determined by the sweep generators provided within the oscilloscope which are conventionally designed to provide any suitable scanning rate. A mask is then provided across the face of the CRT in the same manner as was previously described, and the photomultiplier tube 23 is periodically activated by the presence of the trace in the transparent regions of the mask. These output signals may be amplified at 24 and applied directly to an output utilization device. The scan may be continuously repeated to thereby provide a pulse train comprised of pulses of varying pulse width and duration, which pulse train is only periodic each time the trace is re-initiated. The waveform 47, shown immediately beneath the apparatus of FIGURE 1, shows a pulse train which is capable of being generated by the apparatus of FIGURE 1 wherein the spacing between adjacent pulses and the duration of each pulse is adjustable by means of controlling the scanning rate of the electron beam and the shape of the transparent or cut-out regions of the mask 21.

FIGURE 1a shows a slightly modified apparatus 10' wherein like elements relative to FIGURE 1 are designated by like numerals. The basic distinction between FIGURES 1 and 1a lies in the use of a control unit 36 which is designed to provide the synchronizing signals for read-out into the memory drum 12. Unit 36 is comprised of adjustable drive means 37 which is mechanically coupled to output shaft 38 for rotating drum 12 at any constant predetermined angular velocity. In conjunction therewith, the adjustable drive means 37 is further mechanically coupled to sweep generating means 39 and 40 which may, for example, be comprised of variostats whose output voltage varies in linear fashion relative to rotation thereof so as to generate a Y sweep pulse represented by the sawtooth waveforms 46 and 43 shown in FIGURE 2 with variostat 39 generating waveform 46 and variostat 40 generating waveform 43. The initiation of each waveform causes a pulse to be generated by circuits 41 and 42, respectively, which pulses are directly applied to record heads 18' and 19' for recording the sweep generator synchronizing pulses in tracks 15 and 16. It should be understood that the variostats will be operated at different rates of speed, and the mechanical coupling 44, shown in dotted line fashion for purposes of simplicity, should be understood to include suitable gearing means to provide the desired operational ratios of the elements.

The sawtooth waveform sweep signals 46 and 43, shown in FIGURE 2, are applied to the oscilloscope 20 for controlling the scanning rate of the electron beam. The read-out operation occurs in the same manner as was previously described with respect to FIGURE 1 wherein the trace formed across the face of the tube periodically activates light-sensitive device 23 as the trace passes through transparent regions of the mask 21, causing the output signals amplified at 24 to be recorded in drum track 17 by record head 25. As an alternative embodiment, if desired, the magnetic drum assembly 12 may be omitted and the output pulse train may be taken directly from the output of amplifier circuit 24 at output 24a.

Whereas the above alternative structures have been described for use with a magnetic drum, it should be understood that any other suitable signal storage means may be employed such as, for example, magnetic tapes, magnetic disks, or code disks, code drums, or other surfaces which may be prepared through the use of photographic techniques wherein read-out would occur by detecting reflected light from the moving surface of the code member by suitable light-sensitive means in a a manner much similar to the detection of pulses on a magnetic surface by magnetic read-out heads.

FIGURE 2 shows the time relationship of the Y, X and information pulses employed in a character display system. Waveform 46 represents the output of the Y sweep generator, waveform 43 represents the output of the X generator, and waveform 45 represents the information signals whose duration is dependent upon the time in which the trace crosses a transparent region of the mask. In one example where sixteen horizontal lines, for example, are employed to form a single character or figure, sixteen X sawtooth pulses represented by waveform 43 will be generated during the time in which a single Y sawtooth pulse is generated. Waveform 45 shows that the pulses may be of varying duration during the generation of each X sweep pulse, and further indicates that more than one information pulse may be generated within the time occupied by a single X sawtooth pulse. The synchronizing pulses stored in track 15 of the drum are generated at the initiation of each Y sawtooth pulse such as, for example, at time $t_A$ shown in FIGURE 2. The synchronizing pulses stored in track 16 occur at the initiation of each X sawtooth pulse, the first pulse of which is coincident with time $t_A$, after which each pulse occurs at a time duration $t_B$ in succession.

Turning to another alternative method and apparatus of the present invention, FIGURE 3a shows apparatus 50 useful for testing circuitry to determine whether its operating characteristics fall within desired limits.

The apparatus 50 of FIGURE 3a is comprised of an oscilloscope 51 including a CRT 52. The circuit under test 53 is coupled through a decoupling amplifier which may, for example, be an amplifier 54 to the input terminal of the oscilloscope whose sweep rate is adjusted to cause the trace 55 on the CRT face 52a to remain stationary. An oscillator circuit 56 whose frequency rate is substantially greater than the frequency rate of trace 55 is likewise coupled to the decoupling amplifier 54. The resultant input of the curve developed by test circuit 53 and the signal from oscillator 56 is shown in FIGURE 3b wherein the trace 55 is superimposed by the high frequency signal 56a which represents the output of oscillator 56. The frequency rate of oscillator 56 may be set high enough so as to cause the resultant trace to have the appearance of a trace of predetermined thickness T. Thickness T of the trace may be controlled by adjusting the amplitude of the output signal of oscillator 56. This trace may be photographed by a camera 57 positioned at the outward end of housing 58 which is of the same type as housing 22 shown in FIGURES 1 and 1a, for example. The exposed negative is then developed to yield a mask 59, shown in FIGURE 3c, wherein the entire mask is transparent with the exception of the opaque portion 59a which represents the resultant trace shown in FIGURE 3b. The mask is then positioned against the front face of CRT52, shown in FIGURE 3d and each test circuit 53' to be tested is coupled to the input signal receiving terminal of oscilloscope 51. The trace representing the dynamic characteristic of each circuit 53' under test is caused to be formed upon the face of CRT52 as a result of the manner in which the electron beam of the CRT is deflected by the input signal from test circuit 53'.

The purpose of forming a mask having a trace 59a of some appreciable predetermined thickness is for the purpose of testing each circuit to determine whether its dynamic characteristics lie within predetermined tolerances, which tolerances are controlled by controlling the thickness of the opaque portion 59a of mask 59 which represents the desired trace across a predetermined tolerance band which lies to either side of the desired line representing the trace, which line 59b is shown in dotted fashion in FIGURE 3c. Each trace which lies behind the opaque portion 59a shown in FIGURE 3a (representing each circuit under test) will fail to emit light, causing the light-sensitive device 60 to remain inactivated. If any circuit under test generates a trace representing its dynamic characteristic wherein any portion of this trace falls outside of the region covered by the opaque portion 59a of mask 59, this light, confined within the interior of light tight housing 61, activates the light-sensitive device 60 which generates an output signal amplified at 62 whose amplified output causes the activation of an alarm device 63. If desired, the alarm circuit 63 may be a bistable means which in one output state indicates a circuit having satisfactory characteristics. The setting of the bistable circuit into its opposite output state as a result of the activation of light-sensitive device 60 will yield an alarm signal indicating the fact that dynamic characteristics of the circuit under test do not fall within the prescribed tolerances.

A circuit test method and apparatus may be employed for a variety of other test applications. For example, it may be desired to determine whether the rise and fall time of pulses generated by a pulse generator lie within prescribed tolerances. FIGURE 3e shows a mask 64 and a waveform 65 which may be traced upon the face of a CRT shown superimposed upon the mask for purposes of describing this method. As shown in FIGURE 3e, the waveform 65 is comprised of two pulses 66 and 67 which rise or begin at 66a and 67a and which fall or terminate at 66b and 67b, respectively. Let it be assumed that the desired rise time (i.e. the time in which the pulse reaches its maximum amplitude) must occur at time $t_1$ after it begins its rise at time $t_0$. Further, let it be assumed that the fall time (i.e. the time at which the pulse reaches the zero reference level $t_3$ must begin no sooner than time $t_2$). Also, it may be desired to provide a pulse generator whose pulses must reach zero voltage level at no later than time $t_4$. All of these requirements may be tested for by forming a mask 64 whose entire surface is opaque (as represented by the shaded area) with the exception of the cut-out (or transparent) regions 64a, 64b, 64c and 64d. Any waveform of a pulse generator under test which is superimposed upon the waveform 65 will not fall in any of the transparent or cut-out regions 64a–64d, thereby showing satisfactory results. However, a waveform whose rise time may be represented by the dotted line portion 66a' will cause a trace to move in to the cut-out transparent region 64a indicating that the output pulses of the pulse generator under test are unsatisfactory. In a similar manner, the fall time or termination of the pulse may be represented by the dotted line 66b' which will cross the cut-out or transparent region 64b thereby activating light-sensitive device 60 which, in turn, activates alarm 63 indicating an unsatisfactory characteristic.

The transparent cut-out portions of mask 64 will further test for any other serious or transient effects in which the maximum amplitude of each pulse is caused to drop below a desired level. The above method provides a very straightforward, simple and rapid means of testing such circuits to determine whether their characteristics fall within desired tolerances without the need for direct examination or consideration of the traces formed upon the faces of the CRT. Once the apparatus is set up and adjusted in the proper manner, the only operation required is the connection of each test circuit to the apparatus. The alarm circuit immediately detects the satisfactory or unsatisfactory results of each circuit. If desired, the alarm circuit may be provided with counting means for totaling the number of satisfactory and unsatisfactory circuits which have been tested. As a further alternative, the circuits under test may be broken into categories wherein each batch of circuits is tested by a different mask having broader and broader tolerance bands. Those circuits passing the smallest tolerance band may be groups among the best quality test circuits. Those circuits which fail the strictest tolerance bands may be tested again to determine whether they fall within a second level of tolerances. This operation may be repeated as often as is desired until the circuits under test which prove unsatisfactory even after examination to the widest tolerance bands may be rejected as being totally unsatisfactory. Such arrangements may be employed for testing individual components as well as circuits such as, for example, diodes, transistors and other solid state devices, as well as printed circuit modules, integrated circuits, flat packs and the like.

It can be seen from the foregoing that the present invention teaches a novel method and apparatus for producing pulse generators capable of generating pulses of varying pulse duration and spacing for any one of a variety of purposes and wherein the method and apparatus in a modified form is quite advantageous for use in testing circuits to determine whether their dynamic characteristics fall within prescribed tolerances. The test circuitry and method steps are simple and straightforward and the application of the methods and apparatuses described herein is quite universal.

While preferred embodiments have been described herein, various modifications will become obvious without departing from the spirit of the present invention. For example, the masks which are formed may be produced by drafting or plotting methods as well as by photographic methods. Therefore the scope of the present invention is not to be limited by the description set forth hereinabove, but are the claims appended hereto.

The embodiments of the invention in which an exclusive privilege or property is claimed are defined as follows:

1. A method for generating pulse trains comprised of pulses of varying pulse width and spacing comprising the steps of:
   generating an electron beam in a cathode ray tube;
   directing said electron beam toward the tube face of the cathode ray tube so as to enable the electron beam to impinge upon the tube face and illuminate the phosphor material of the tube face;
   deflecting the electron beam in line by line fashion at a predetermined rate to cause the electron beam to scan the tube face in said line by line fashion;
   providing an opaque mask and forming transparent openings in said mask wherein the width of said openings controls the pulse width of the desired pulses and wherein the spacings between said transparent openings control the spacings between pulses;

positioning said mask upon the face of said cathode ray tube;

generating pulses each of which is initiated as the electron beam, while moving along the line across the face of the cathode ray tube, enters into the region defined by the transparent portion of the mask and each of which is terminated as the electron beam passes beyond the region defined by the transparent portion of the mask.

2. The method of claim 1 further including the step of storing the pulses generated in storage means for subsequent readout.

3. The method of claim 2 wherein the step of storing said pulses is comprised of storing said pulses upon a surface as it rotates; and reading out the pulses from said surface by rotating the surface at a rotating speed greater than the speed during the storing operation.

4. Apparatus for generating a pulse train comprised of varying pulse width and spacing comprising:
a cathode ray tube including an electron beam generating means and means for deflecting said beam to scan the face of said cathode ray tube in line by line fashion;
means coupled to said deflecting means for controlling the rate at which said electron beam scans the tube face;
a mask having a plurality of opaque and transparent regions positioned upon the face of said cathode ray tube the width of said transparent regions controlling the width of said pulses and the spacing between transparent regions controlling the spacing between said pulses;
light-sensitive means energized by said cathode ray tube each time the electron beam of said tube, in moving across said tube face, enters a transparent region of said mask for generating pulses which begin as soon as said electron beam enters a transparent region and which terminate as soon as said electron beam leaves a transparent region.

5. The apparatus of claim 4 further comprising a memory means;
means coupled between said memory means and said light-sensitive means for storing said pulses in said memory means.

6. The apparatus of claim 5 wherein said memory means is a magnetic memory means and said storing means is comprised of record heads for storing said pulses in the form of magnetic patterns in said magnetic memory means.

7. The apparatus of claim 5 wherein said memory means is a magnetic drum memory, said storing means comprising record heads for storing said pulses in the form of magnetic patterns in said magnetic drum memory.

8. The apparatus of claim 7 further comprising means for rotating said magnetic drum memory at a predetermined constant angular velocity during the recording operation.

9. The apparatus of claim 7 further comprising means for rotating said magnetic drum memory at a predetermined constant angular velocity during the recording operation; said rotating means being adapted to rotate at an angular velocity greater than that employed during recording at the read-out of said pulses.

10. The apparatus of claim 5 further comprising means for storing electron beam sweep synchronizing signals in said memory means in conjunction with said pulse signals.

11. A method for testing the dynamic characteristics of electronic circuits or elements comprising the steps of:
producing a transparent mask having opaque portions representing the dynamic characteristic to be examined; adjusting the thickness of the opaque portions to adjust the tolerance band to include deviations from the desired characteristic curve which are acceptable;
coupling a cathode ray tube to the circuit or element under test to sequentially generate a trace representing the dynamic characteristic curve for that circuit or element; positioning said mask upon the face of the cathode ray tube;
generating a signal each time said electron beam passes into a transparent region;
rejecting all those circuits or elements tested which cause the generation of a signal during the dynamic test.

12. Apparatus for testing electronic circuits or components comprising:
cathode ray tube means coupled to the circuit under test for sequentially generating a characteristic curve on its face thereof representative of the dynamic characteristic under test;
a mask positioned upon the face of said cathode ray tube means;
light-sensitive means positioned to be activated by light emitted upon the face of said cathode ray tube means;
said mask having at least one opaque region whose shape generally conforms to the configuration of the desired characteristic curve for the circuit under test, the thickness of said opaque region being sufficient to block light rays generated at the face of said cathode ray tube means which are produced by characteristic curves which deviate from the desired curve by an acceptable amount.

13. The apparatus of claim 12 further comprising means coupled to said light-sensitive means for generating an alarm when said light-sensitive means is activated by light emitted from said tube face to indicate a circuit or element having an unsatisfactory characteristic curve.

References Cited

UNITED STATES PATENTS

| 2,922,049 | 1/1960 | Sunstein | 315—10 |
| 2,963,652 | 12/1960 | Taylor et al. | 324—121 |
| 2,933,255 | 4/1960 | Kohl | 315—10 |

RODNEY D. BENNETT, Primary Examiner

J. G. BAXTER, Assistant Examiner

U.S. Cl. X.R.

324—121